United States Patent [19]

Weidman

[11] Patent Number: 5,397,282
[45] Date of Patent: Mar. 14, 1995

[54] TWO-SPEED PLANETARY FINAL DRIVE SYSTEM WITH SELF-TIMED FREEWHEELER SHIFTS

[76] Inventor: William A. Weidman, 4268 Sugar Maple La., Okemos, Mich. 48864

[21] Appl. No.: 117,725

[22] Filed: Sep. 7, 1993

[51] Int. Cl.⁶ ............................................. F16H 29/22
[52] U.S. Cl. .................................. 475/205; 475/290; 475/291; 475/318; 475/321
[58] Field of Search ............... 475/205, 206, 221, 275, 475/279, 290, 291, 317, 318, 320, 321

[56] References Cited

U.S. PATENT DOCUMENTS

| | | | |
|---|---|---|---|
| 1,259,065 | 3/1918 | Anibal . | |
| 2,700,311 | 1/1955 | Bade | 74/674 |
| 4,114,478 | 9/1978 | Clauss | 74/781 R |
| 4,223,569 | 9/1980 | Koivunen | 74/665 GE |
| 4,412,459 | 11/1983 | Goscenski, Jr. | 74/711 |
| 4,589,304 | 5/1986 | Ashikawa et al. | 74/701 |
| 4,976,670 | 12/1990 | Klemen | 475/278 |
| 5,046,997 | 9/1991 | Koivunen | 475/221 |
| 5,133,697 | 7/1992 | Hattori | 475/290 X |

FOREIGN PATENT DOCUMENTS 3249453  11/1991  Japan ................... 475/291

OTHER PUBLICATIONS

*Hydra-Matic 4T80-E Technician's Guide*, 17001.19, p. 8.

Primary Examiner—Charles A. Marmor
Assistant Examiner—Mary Ann Battista
Attorney, Agent, or Firm—Charles R. White

[57] ABSTRACT

A final drive for a multi-speed power transmission has freewheeler timed up and down forward power shifts utilizing two planetary gear sets connected between the transmission and differential. For low ratio a smaller diameter sun gear of a first gear set is driven through a freewheeler with the associated ring gear held for reaction so that the pinion carrier assembly drives the differential at a low ratio. For high ratio, a larger diameter sun gear of a second gear set is directly driven while a high-reverse clutch holds the associated ring gear for reaction. The pinion carrier assembly common to both gear sets drives the differential at a higher speed ratio as the freewheeler overruns on torque reversal. The ring gear of the second gear set of one embodiment has a path to ground through an additional freewheeler for coast control. The outer race of the low-ratio freewheeler has external teeth to park-lock the associated sun gear through a grounded parking pawl. Reverse drive from the transmission is established by apply of the high-reverse clutch for drive of the common carrier.

9 Claims, 2 Drawing Sheets

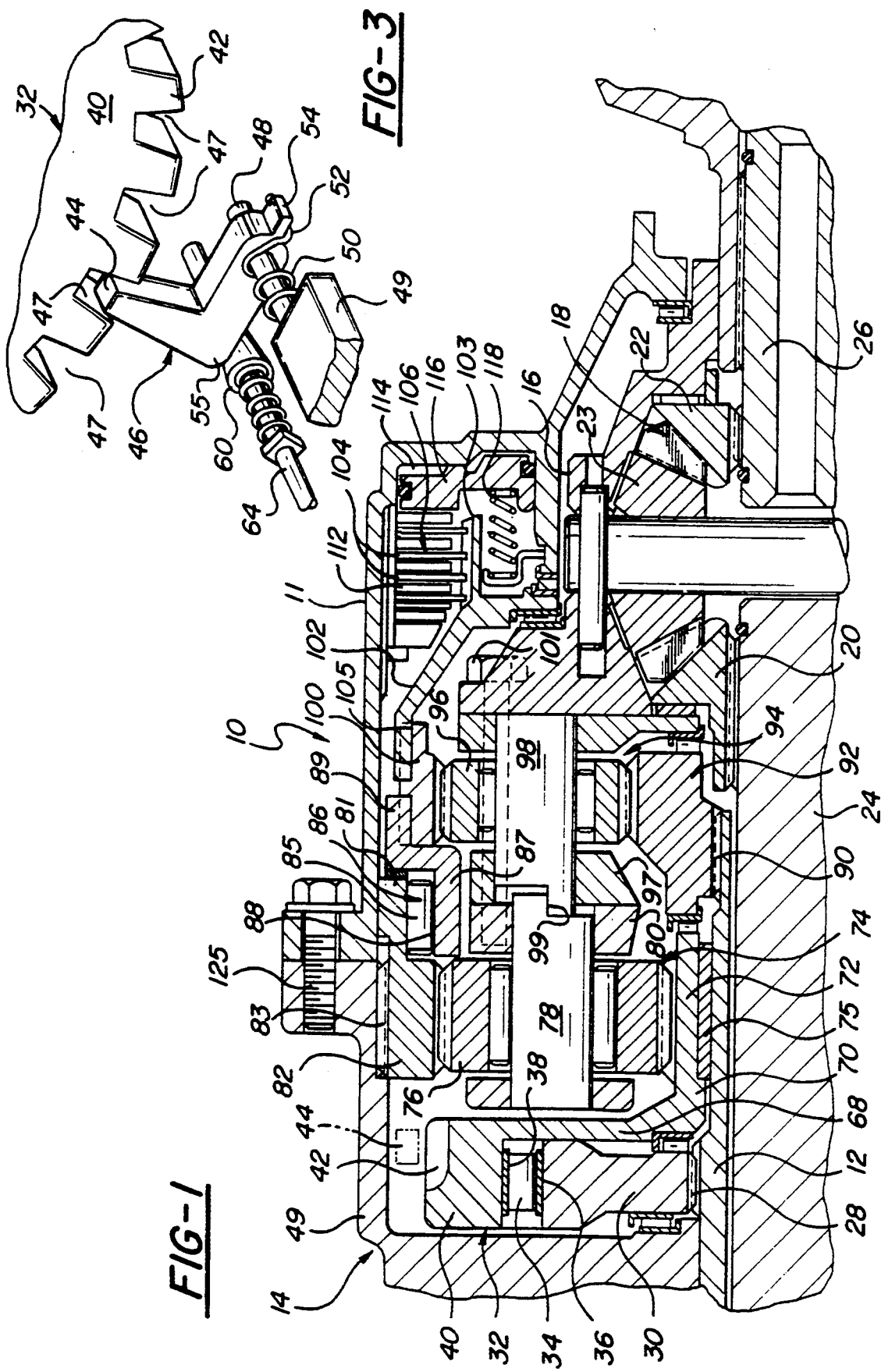

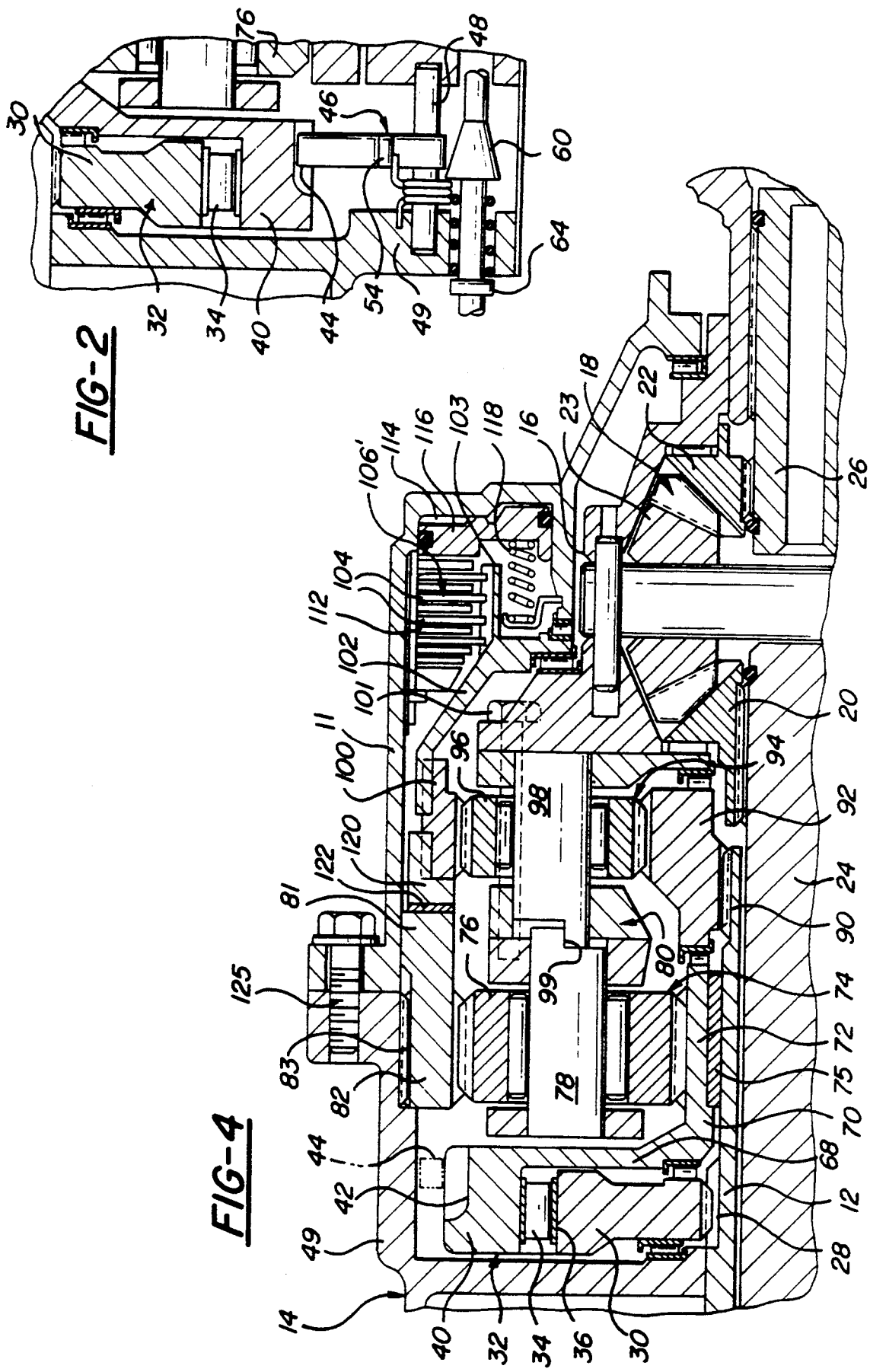

TWO-SPEED PLANETARY FINAL DRIVE SYSTEM WITH SELF-TIMED FREEWHEELER SHIFTS

FIELD OF THE INVENTION

This invention is drawn to a multi-ratio final drive for vehicle power transmissions or transaxles, and more particularly to a two-speed planetary drive featuring freewheeler up and down shifts automatically responding to torque reversals for smooth and uninterrupted power shifting.

BACKGROUND OF THE INVENTION

Final drives have been devised to integrate the output of multi-speed power transmissions with the input of a differential unit while providing an increased number of overall steps in the transmission ratio gearing. An example of one such unit is found in U.S. Pat. No. 5,046,997 issued Sep. 10, 1991 to E. A. Koivunen. In this prior art patent a two stage or ratio final drive has stepped pinion planetary gearing operatively controlled by selectively braked ring gears to provide for the two ratios. In this prior patent and in contrast to the present invention, a dual mode or double acting roller clutch is selectively controlled to provide a path to ground in two directions when the transmission is conditioned for Park, Reverse or Neutral and a path to ground in one direction during the operation in the forward direction.

SUMMARY OF THE PRESENT INVENTION

The present invention is of the general category of that of the above referenced patent but provides unique planetary gearing incorporating first and second planetary gear sets and associated freewheeler and drive establishing devices to provide new and improved stepped ratio drives to the differential. With the present invention, self-timed freewheeler upshifts and downshifts provide for smooth and uninterrupted power shift operation in the final drive without materially adding to the complexity of the transmission and controls therefor.

In this invention, there is a new and improved low input freewheeler which locks in one direction of rotation to transmit input drive torque to a small pitch diameter sun gear of the first planetary gear set. Low ratio output to the drive differential or other output is through a carrier assembly rotatably supporting the planet gears of the first gear set with the ring gear held for reaction.

In this invention, a drive establishing device is provided by a friction clutch selectively engageable to hold the ring gear of the second planetary gear set with input torque from the transmission directly driving the associated sun gear having a pitch diameter greater than that of the sun gear of the first planetary gear set. Second planet gears mesh with sun and ring gears of the second planetary gear set. High ratio output is through the planetary gear carrier assembly common to both gear sets. Up and down shifts between high and low ratios are automatically timed by torque reversals to the freewheeler.

In one embodiment of the final drive, a second freewheeler associated with the second planetary gear set holds the ring gear thereof for reaction in response to vehicle coast (i.e. drive from the road wheels to the transmission) so that vehicle road wheel torque is transmitted through the sun gear of the second planetary and back to the transmission at an overdrive ratio. Since the associated transmission is in a forward drive gear during coast, engine compression and speed provides the retarding forces for engine braking.

In a second embodiment, the precisely timed engagement of the friction clutch to hold the ring gear for reaction on a coast mode by operation of transmission controls eliminates the need for a second freewheeler.

With this invention, new and improved parking lock or brake construction is provided with the peripheral surface of the outer race of the low ratio freewheeler providing a toothed parking annulus. This parking annulus is selectively engaged by a parking pawl mounted on the transmission case.

This invention is a straight forward final drive which can be easily assembled and which can be packaged to meet the space requirements of commercial transmissions or transaxles. This invention increases the overall number of ratios for transmissions and provides flexible selection of ratio steps over a wide range of speeds. This invention is adaptable for various splitter gear application with separate inputs to each of the sun gears of the two planetary gear sets.

These and other features, objects and advantages of this invention will become more apparent from the following detailed description and drawing.

DESCRIPTION OF THE DRAWING

FIG. 1 is a sectional view of a portion of a final drive for a change-speed transmission;

FIG. 2 is a fragmentary cross-section view of a portion of the final drive showing the parking pawl arrangement for the final drive;

FIG. 3 is a pictorial view of the parking pawl arrangements of the transmissions of this invention; and FIG. 4 is a sectional view of a portion of another final drive illustrating a second embodiment of this invention.

DESCRIPTION OF THE PREFERRED EMBODIMENT

Turning now in greater detail to the drawing, there is shown in FIG. 1 a stepped ratio final drive planetary gear unit 10 housed in casing 11 operatively connecting the tubular output shaft 12 of a change speed power transmission 14 to the input carrier 16 of a differential gear unit 18. The transmission may be of any suitable design such as that disclosed in the *Hydra-Matic 4T80-E Technician's Guide*, 17001.19, © Copyright 1992 by Powertrain Division of General Motors Corporation, hereby incorporated by reference.

The differential gear unit 18 has output side gears 20, 22, driven by differential input gears such as gear 23 at varying or equal speeds for cornering or for straight ahead driving of the connected output shafts 24, 26 that are operatively connected to the drive wheels of the vehicle in which the transmission and final drive is utilized.

The tubular output shaft 12 rotatably driven by the gearing, not shown, of the transmission 14 that may, for example, provide four forward ratios and reverse. This output shaft surrounds a portion of the differential output shaft 24 and is externally splined at 28 for drive connection to the inner race 30 of a one-way roller or a sprag clutch assembly 32 often called a freewheeler.

In the FIG. 1 embodiment, the freewheeler 32 has a plurality of arcuately spaced rollers 34 operatively mounted in conventional camming ramps 36, 38 provided in the annular interior interfaces between the inner race 30 and an outer race 40. The outer race 40 has a plurality of arcuately spaced teeth 42 formed in the enlarged circumference thereof to provide locking spaces for the tooth 44 of a parking pawl 46 to provide a park lock mechanism.

The parking pawl 46, see FIGS. 2 and 3, is generally an L-shaped member mounted by pin 48 to the casing 49 of the transmission for turning movement between a locked position in which the pawl tooth 44 engages any one of the tooth spaces 47 between the outer locking teeth on the outer race 40 of the one-way clutch 32 shown in FIGS. 2 and 3, and a released position in which the pawl tooth is spring biased out of the locking spaces 47.

To this end, a helical spring 50 coiled around the pin 48 has one end grounded to the casing 49 and a free end 52 that extends across a tab 54 of the pivot arm 55 of the pawl to spring bias the pawl counterclockwise on pin 48 to effect the release of the outer race of the one-way clutch 32 by the pawl tooth 44. When released from the parked condition, any of the forward drive ranges or reverse may be selected by the vehicle operator.

The parking pawl is moved from the unlocked position to the park-lock position by action of a cam 60 mounted on a manually shiftable park lock actuator rod 64 that is supported for linear shifting movement within the transmission casing. This actuator rod is connected by linkages and a cable mechanism to manually operated controls within the compartment of the vehicle to allow the vehicle operator to shift between park and the various drive ratios, as is well known in the art. Accordingly, when the shift control lever is manually moved from park, the cam surface 60 disengages the pivot arm of the pawl and spring 50 turns the pawl on the pivot pin to a release position so that the output shafts of the final drive are free to turn.

Additionally, the outer race of the one-way clutch 32 is drivingly connected by a radial hub portion 68 that has an axially projecting neck 70 which connects to a helical toothed sun gear 72 of a low ratio planetary gear set 74 of the planetary gearing 10. This sun gear mounted on sleeve bearing 75 meshes with helical toothed pinion gears 76 rotatably mounted on pinion shafts 78 pressed or otherwise affixed to a carrier 80. The pinion gears mesh with the helical teeth of a ring gear 82 which is externally splined at 83, or is otherwise connected, to the transmission casing. The ring gear 82 is made with an outwardly extending shoulder 81 that forms the outer race of a one-way brake or freewheeler 86 employed for coast operation.

The freewheeler 86 has arcuately spaced rollers 85 in associated camming ramps provided in the inner diameter of the outer race. The inner race 87 has a cylindrical outer surface 88 on which the rollers are mounted. The inner race is further formed with large-diameter, axially-extending hub 89 splined, or otherwise connected, to a ring gear 100 of a second planetary gear set 94.

In addition to driving the inner race 30 of the freewheeler 32, as well as the outer race when the freewheeler locks, the tubular output shaft 12 provides a direct drive into the second helically-geared planetary gear set 94. More particularly, shaft 12 extending from the transmission is splined at 90 to the sun gear 92 of the second planetary gear set 94 for selective drive of sun gear 92 in a splitter operation. This sun gear has a pitch diameter greater than that of the sun gear 72 of the first planetary gear set 74 to provide a higher speed ratio.

The second gear set has pinion gears 96 rotatably supported on pinion shafts 98 pressed into a carrier 97. The pinion shafts 78 of the first planetary gear set are end lapped at 99 with pinion shafts 98 of the second planetary gear set so that the pinion shafts are further retarded from turning in their carriers. The carriers 80 and 97 are connected by threaded fasteners 101 so that they form a common carrier assembly for the two planetary gear sets.

The pinion gears 96 mesh with the sun gear 92 and with the ring gear 100. The ring gear is externally splined at 105 to the inboard end of an annular shell 102. This shell has an annular outboard projecting shoulder 103 which is externally splined to carry alternate friction plates 104 of a multi plate friction drive establishing device 106, alternatively known as a clutch or brake. The friction plates 104 are interleaved with friction plates 112 splined to the casing 11 to form the friction drive establishing device 106 which in this embodiment is a high-reverse clutch.

This friction device is selectively engaged when transmission controls, not illustrated, are conditioned to supply pressure fluid to a chamber 114 of an apply piston 116 operatively mounted in the casing 11. On chamber pressurization, the piston 116 strokes against the force of return springs 118 to effect the grounding of the ring gear 100 of the second planetary gear set. When this occurs, the carrier assembly (carriers 80 and 97) will be driven at a higher speed ratio by the sun gear 92 of the second planetary gear set.

Since the carrier assembly will be rotatably driven at a higher speed in the forward direction and with the ring gear 82 of the first planetary gear set held, the low sun gear 72 will be driven at a speed faster than the speed of the inner race 30 of the one-way freewheeler 32. The outer race 40 of the freewheeler being driven by the sun gear 72 overruns the inner race by virtue of the release of the inner and outer races by the rollers 34. Accordingly, there is a smooth automatically timed upshift as the one-way clutch or freewheeler 32 overruns for the powered drive of output shafts 24 and 26 at the higher speed ratio provided by the second planetary gear set.

In this invention, the coast freewheeler 86 is provided so that in a coast condition a negative or back drive from the drive wheels to the transmission effects freewheeler engagement to hold the ring gear 100 of the second planetary gear for reaction. With the input to the planet carrier assembly from the drive wheels and differential, the sun gear 92 of the second planetary gear set will drive the transmission shaft 12 at an overdrive speed.

During such coasting or negative drive, torque from the drive wheels is transmitted into the change speed transmission 14. Since the transmission is in gear, compression from the engine and engine speed provide for engine braking.

The following Schedules A, B, C and D illustrate preferred operation of the final drive of this invention with a four speed automatic transmission, such as that disclosed in the above-referenced *Hydramatic 4T80-E Technician's Guide*, to produce five, six, seven and eight overall ratios for vehicle propulsion in a forward direction. In upshifting and downshifting, automatically self-timed high-low freewheeler shifts occur in the final drive ratios.

SCHEDULE A

| TRANSMISSION OR TRANSAXLE OPERATION | FINAL DRIVE | | | Overall Speed Ratios |
|---|---|---|---|---|
| | Reverse - High Clutch Condition Positive Drive | Final Drive Ratio | Coast Freewheeler Condition Negative Drive | |
| Park | Off | — | — | — |
| Reverse | On | High | Off | — |
| Neutral | Off | — | — | — |
| 1st Gear | Off | Low | On | 1st |
| 2nd Gear | Off | Low | On | 2nd |
| 3rd Gear | Off | Low | On | 3rd |
| 4th Gear | Off | Low | On | 4th |
| 4th Gear | On | High | Off | 5th |

SCHEDULE B

| TRANSMISSION OR TRANSAXLE OPERATION | FINAL DRIVE | | | Overall Speed Ratios |
|---|---|---|---|---|
| | Reverse - High Clutch Condition Positive Drive | Final Drive Ratio | Coast Freewheeler Condition Negative Drive | |
| Park | Off | — | — | — |
| Reverse | On | High | Off | — |
| Neutral | Off | — | — | — |
| 1st Gear | Off | Low | On | 1st |
| 2nd Gear | Off | Low | On | 2nd |
| 3rd Gear | Off | Low | On | 3rd |
| 3rd Gear | On | High | Off | 4th |
| 4th Gear | Off | Low | On | 5th |
| 4th Gear | On | High | Off | 6th |

SCHEDULE C

| SEVEN-SPEED AUTOMATIC TRANSMISSION | FINAL DRIVE | | | Overall Speed Ratios |
|---|---|---|---|---|
| | Reverse - High Clutch Condition Positive Drive | Final Drive Ratio | Coast Freewheeler Condition Negative Drive | |
| Park | Off | — | — | — |
| Reverse | On | High | Off | Rev |
| Neutral | Off | — | — | — |
| 1st Gear | Off | Low | On | 1st |
| 2nd Gear | Off | Low | On | 2nd |
| 2nd Gear | On | High | Off | 3rd |
| 3rd Gear | Off | Low | On | 4th |
| 3rd Gear | On | High | Off | 5th |
| 4th Gear | Off | Low | On | 6th |
| 4th Gear | On | High | Off | 7th |

SCHEDULE D

| EIGHT-SPEED AUTOMATIC TRANSMISSION | FINAL DRIVE | | | Overall Speed Ratios |
|---|---|---|---|---|
| | Reverse - High Clutch Condition Positive Drive | Final Drive Ratio | Coast Freewheeler Condition Negative Drive | |
| Park | Off | — | — | — |
| Reverse | On | High | Off | Rev |
| Neutral | Off | — | — | — |
| 1st Gear | Off | Low | On | 1st |
| 1st Gear | On | High | Off | 2nd |
| 2nd Gear | Off | Low | on | 3rd |
| 2nd Gear | On | High | Off | 4th |
| 3rd Gear | Off | Low | on | 5th |
| 3rd Gear | On | High | Off | 6th |
| 4th Gear | Off | Low | On | 7th |
| 4th Gear | On | High | Off | 8th |

In the transmission or transaxles of the above schedules, the coast freewheeler 86 of the final drive automatically engages to hold the ring gear 100 when there is negative power flow to the transmission through sun gear 92 of the high ratio planetary gear set 94. With such back drive through the gearing in the transmission 14 engine braking is obtained from compression in the power cylinders thereof.

In the embodiment of the invention shown in FIG. 4, the one-way coast freewheeler of the first embodiment has been eliminated since the clutch 106' can be selectively engaged with precisioned timing such as by electronic controls, not shown, to hold ring gear 100 of the second planetary gear set for coast over-run. This clutch when released by the controls, effects automatic freewheeler shifts to low. An annular thrust block 120 and a thrust washer 122 are installed between the ring gear 100 and the extending shoulder 81 of the ring gear 82 of the first planetary gear set for receiving and transmitting lateral gear thrust from the helix action of the meshing planetary and ring gears when the ring gear is held for reaction. In other aspects, the structure and operation of the two-speed planetary final drive is the same as in the first embodiment.

In both embodiments the final drive casing 11 is coupled to the transmission casing by bolts such as bolt 125 shown in the Figures.

This invention can be readily employed with a wide range of transmissions having differing numbers of speed rations to provide smaller and more even ratio steps. The drive of this invention can be employed with front, rear or four-wheel multi-axle vehicles. In addition to being used in transaxle applications, this invention can be employed in a wide range of in-line transmissions to provide the advantageous increase in overall number of stepped ratios.

While a preferred embodiment of the invention has been shown and described, other embodiments will now become apparent to those skilled in the art. Accordingly, this invention is not to be limited to that which is shown and described but by the following claims.

What is claimed is:

1. A multi-ratio drive unit for operative connection between the output of a change-speed power transmission and an output drive for driving the drive axles of an automotive vehicle, said drive unit comprising a one-way clutch having an inner race operatively connected to the output of said power transmission, an outer race disposed radially outward of said inner race and one-way mechanisms operatively connected between said inner and outer races so that said inner race can rotatably drive said outer race when said inner race is rotated in one direction and said outer race can overrun said inner race when said outer race is rotatably driven at a faster speed and in the same direction as said inner race, first and second planetary gears sets, each of said gear sets having a sun gear, planet gears, a ring gear and carrier means for said planet gears operatively connected to said output drive, said outer race of said one-way clutch being drivingly connected to the sun gear of said first planetary gear set and holding means to hold said ring gear of said first planetary gear set for reaction when said sun gear of said first planetary gear set is rotatably driven so that said carrier means is forwardly driven to drive said output drive at a first forward drive ratio, and first and second means for holding said ring gear of said second planetary gear set for reaction to effect the shift of said drive unit from said first forward drive ratio to another forward drive ratio with torque reversal to said one-way clutch so that said outer race overruns the inner race thereof and further for holding said ring gear of said second planetary gear set for reaction when said carrier means is reversely driven by said output drive during coast so that the output of said change speed power transmission will be driven through the sun gear of said second planetary gear set.

2. The multi-ratio drive unit of claim 1, wherein said second means for holding said last mentioned ring gear is a coast freewheel brake unit operatively connected to said ring gear.

3. A multi-ratio drive unit for operative connection between the output of a power transmission and drive mechanism for driving the drive axles of an automotive vehicle, said multi-ratio drive unit comprising race a one-way clutch having an inner operatively connected to said output of said power transmission, an outer race disposed radially outward of said inner race and one-way mechanisms operatively connected between said inner and outer races so that said inner race can rotatably drive said outer race when said inner race is rotatably driven in a first direction relative to said outer race and so that said outer race can freewheel relative to said inner race when said outer race is rotatably driven in the first direction and at a speed faster than that of said inner race, first and second planetary gear sets, each of said gear sets having sun gear means, planet gear means and ring gear means and a common carrier assembly providing an output for both of said gear sets, said outer race of said one-way clutch being drivingly connected to said sun gear of first planetary gear set and first means to hold said ring gear of said first planetary set for reaction to provide a first ratio, and second selectively engageable means to hold said ring gear of said second planetary gear set for reaction to provide a second and higher speed ratio with an uninterrupted power upshift on torque reversal to the outer race of said one-way clutch.

4. A power transmission having
  a. input and output drive means,
  b. first and second planetary gear set means operatively interconnecting said input and output drive means,
  c. each of said planetary gear set means having sun and ring gear means operatively interconnected by planet gears,
  d. a common carrier means for said planet gears of each of said planetary gear set means operatively connected to said output drive means,
  e. one-way power transmitting drive means operative to establish an input from said input drive means to one of said gear means of said first planetary gear set means while another of said gear means of said first planetary gear set means is held for reaction to effect the drive of said carrier means and the establishment of a first ratio drive of said output drive means by the drive of said input drive means,
  f. selectively engagable friction drive establishing device means for selectively holding one of said gear means of said second planetary gear set means for reaction while another of said gear means of said second planetary gear set means is driven by said input drive means to effect torque reversal to said one-way power transmitting drive means so that said drive through said first gear set is released while said second planetary gear set is conditioned for a second ratio drive of said output drive means by the drive of said input drives means.

5. A transmission for transmitting drive torque from an input to an output comprising transmission input means, transmission output means and first and second planetary gear sets, each of said planetary gear sets comprising sun gear means, planet gear means meshing with said sun gear means and ring gear means meshing with said planet gear means of said first and second gear sets, a common carrier for said planet gear means of said first and second gear sets, said common carrier being drivingly connected to said transmission output means, means for holding one of said gear means of said first planetary gear set for reaction and one-way freewheel means for operatively connecting another of said gear means of said first planetary gear set to said input so that said input can drive said another of said gear means of said first planetary gear set in one direction and said first gear set resultantly drives said output at a first gear ratio, and selectively engagable means for holding one of said gear means of said second planetary gear set for reaction and a higher gear ratio in response to drive of another of said gear means of said second planetary gear set by said input means while said one-way freewheel means is driven in a freewheel direction.

6. The transmission of claim 5, including a casing wherein said freewheel means has inner and outer races operatively interconnected by one-way drive elements therebetween, parking tooth means provided on said outer race of said and parking pawl means operatively connected to the casing for selective engagement with said tooth means for park-locking said transmission.

7. The transmission of claim 5, wherein said freewheel means has an inner and outer race and wherein said outer race is driven at an overdrive when said second gear set is driving said output.

8. The transmission of claim 7 and further comprising a second freewheeler having an inner race operatively connected to said ring gear means of said second gear set and having a stationary outer race and one-way drive means operatively disposed between said inner race and said outer race of said second freewheeler, and means to hold said second ring gear for reaction when said output drives said input during transmission coast operation.

9. A change-speed transmission for transmitting torque between a transmission input and a transmission output comprising first and second planetary gear sets, each of said gear sets having a sun gear and a ring gear and planetary gears operatively meshing with said sun gear and said ring gear, carrier means for the planetary gears of said first and second gear sets, one-way overrun drive means operatively connected between said transmission input and said sun gear of said first gear set, means for holding said ring gear of said first planetary gear set for reaction so that said transmission input drives said transmission output through said transmission carrier means at a first input/output speed ratio, said sun gear of said second planetary gear set being drivingly connected to said transmission input and having a pitch diameter greater than the pitch diameter of said sun gear of said first planetary gear set, and selectively engagable friction drive establishing device for selectively holding said ring gear of said second planetary gear set for reaction so that said input drives said sun gear of said second planetary gear set and said carrier drives said output at a second input/output speed ratio while effecting the overrun of said one-way drive means.

* * * * *